(12) United States Patent
Hofmann

(10) Patent No.: US 7,087,527 B2
(45) Date of Patent: Aug. 8, 2006

(54) EXTENDED KALMAN FILTER INCORPORATING OFFLINE METROLOGY

(75) Inventor: Jim Hofmann, Boise, ID (US)

(73) Assignee: Micron Technology, Inc., Boise, ID (US)

( * ) Notice: Subject to any disclaimer, the term of this patent is extended or adjusted under 35 U.S.C. 154(b) by 397 days.

(21) Appl. No.: 10/232,854

(22) Filed: Aug. 28, 2002

(65) Prior Publication Data

US 2004/0043700 A1    Mar. 4, 2004

(51) Int. Cl.
*H01L 21/302* (2006.01)

(52) U.S. Cl. ...................................... 438/691; 438/692

(58) Field of Classification Search ................ 438/691, 438/692; 700/95, 121
See application file for complete search history.

(56) References Cited

U.S. PATENT DOCUMENTS

| | | | |
|---|---|---|---|
| 4,641,238 A | 2/1987 | Kneib | 710/110 |
| 5,865,665 A | 2/1999 | Yueh | 451/5 |
| 6,230,069 B1 * | 5/2001 | Campbell et al. | 700/121 |
| 6,285,971 B1 * | 9/2001 | Shah et al. | 703/2 |
| 6,290,572 B1 | 9/2001 | Hofmann | 451/5 |
| 6,383,934 B1 | 5/2002 | Sabde et al. | 438/692 |
| 6,447,369 B1 | 9/2002 | Moore | |
| 6,461,964 B1 | 10/2002 | Hofmann et al. | 438/692 |
| 6,464,824 B1 | 10/2002 | Hofmann et al. | 156/345 |
| 6,468,912 B1 | 10/2002 | Hofmann et al. | 438/692 |
| 6,472,375 B1 | 10/2002 | Hoon et al. | 514/44 |
| 6,492,273 B1 | 12/2002 | Hofmann et al. | 438/692 |
| 6,547,640 B1 | 4/2003 | Hofmann | 451/5 |
| 6,609,947 B1 | 8/2003 | Moore | |
| 6,636,946 B1 | 10/2003 | Jeddeloh | 711/138 |
| 2001/0024880 A1 | 9/2001 | Hofmann et al. | 438/692 |
| 2001/0024881 A1 | 9/2001 | Hofmann et al. | 438/692 |
| 2001/0024882 A1 | 9/2001 | Hofmann et al. | 438/692 |
| 2001/0036805 A1 * | 11/2001 | Birang et al. | 451/527 |
| 2002/0098696 A1 | 7/2002 | Sabde et al. | 438/689 |
| 2002/0119731 A1 | 8/2002 | Hofmann | 451/5 |
| 2002/0124957 A1 | 9/2002 | Hofmann et al. | 156/345.12 |
| 2002/0133673 A1 | 9/2002 | Jeddeloh | 711/138 |
| 2003/0057185 A1 | 3/2003 | Hofmann | 216/89 |
| 2003/0060046 A1 | 3/2003 | Hofmann et al. | 438/689 |
| 2003/0060047 A1 | 3/2003 | Hofmann et al. | 438/689 |
| 2003/0219962 A1 | 11/2003 | Hofmann et al. | 438/489 |
| 2003/0229410 A1 * | 12/2003 | Smith et al. | 700/109 |

OTHER PUBLICATIONS

Merriam Webster Online dictionary; http://www.m-w.com/cgi-bin/dictionary?book=Dictionary&va=online.*

Vincent, Tyrone L., et al., "A Highly Accurate Endpoint Method for a TFT Back Channel Recess Etch", *ISSN1083-1312/971/1701-04274*, (1997),pp. 274-277.

Vincent, Tyrone L., et al., "An Extended Kalman Filter Based Method for Fast In-Situ Etch Rate Measurements", *Mat. Res. Soc. Symp. Proc.* vol. 406, (1996),pp. 87-93.

(Continued)

*Primary Examiner*—Nadine G. Norton
*Assistant Examiner*—Binh X. Tran
(74) *Attorney, Agent, or Firm*—Schwegman, Lundberg, Woessner & Kluth, P.A.

(57) ABSTRACT

An algorithm uses offline metrology to control a process by passing information from an outer control loop to an inner control loop, extended Kalman filter estimator. The inner control loop operates online, and the outer control loop operates asynchronously with respect to the inner control loop. The online control loop is updated for each subsequent process. The offline metrology is optionally updated for each subsequent process.

13 Claims, 7 Drawing Sheets

OTHER PUBLICATIONS

Vincent, Tyrone L., et al., "An Extended Kalman Filtering-Based Method of Processing Reflectometry Data for Fast In-Situ Etch Rate Measurements", *IEEE Transactions on Semiconductor Manufacturing*, vol. 10, No. 1, (Feb. 1997),pp. 42-51.

Vincent, Tyrone L., et al., "End Point and Etch Rate Control Using Dual-Wavelength Laser Reflectometry With A Non-linear Estimator", *J. Electrochem. Soc*. vol. 144 No. 7, (Jul. 1997), pp. 2467, 2469 and 2472.

* cited by examiner

EXTENDED KALMAN FILTER INCORPORATING OFFLINE METROLOGY

TECHNICAL FIELD

An embodiment relates to an algorithm that uses offline metrology in controlling intermediate process conditions and in predicting an endpoint in a process. One embodiment includes application of the algorithm to a polishing process.

COPYRIGHT NOTICE/PERMISSION

A portion of the disclosure of this patent document contains material which is subject to copyright protection. The copyright owner has no objection to the facsimile reproduction by anyone of the patent document or the patent disclosure as it appears in the Patent and Trademark Office patent file or records, but otherwise reserves all copyright rights whatsoever. The following notice applies to the software and data as described below and in the drawing hereto: Copyright© 2002, Micron Technology, Inc., All Rights Reserved.

TECHNICAL BACKGROUND

During semiconductor device fabrication, several polishing processes can be used to prepare a substrate surface for the next integrated structure. The polishing process typically used is one of mechanical polishing ("MP"), chemical polishing also referred to as etchback, and chemical-mechanical polishing ("CMP"). Collectively, these polishing operations can be referred to as CMP. CMP is frequently used as it combines chemical action with mechanical shear and sweep action to remove material from the upper surface of a wafer.

The CMP processes should consistently and accurately produce a uniformly planar surface on the substrate to enable precise fabrication of circuits and photo-patterns. During the fabrication of transistors, contacts, interconnects and other features, many substrates develop large step heights that create highly topographic surfaces across the substrates. Such highly topographical surfaces can impair the accuracy of subsequent photolithographic procedures and other processes that are necessary for forming sub-micron features. For example, it is difficult to accurately focus photo patterns to within tolerances approaching 0.1 micron on topographic surfaces because sub-micron photolithographic equipment generally has a very limited depth of field. Thus, CMP processes are often used to transform a topographical surface into a highly uniform, planar surface at various stages of manufacturing the microelectronic devices.

It is also desirable to maximize the throughput of CMP processing by producing a planar surface on a substrate as quickly as possible. The throughput of CMP processing is a function, at least in part, of the ability to accurately stop CMP processing at a desired endpoint. In a typical CMP process, the desired endpoint is reached when the surface of the substrate is planar and/or when enough material has been removed from the substrate to form discrete components on the substrate (e.g., shallow trench isolation areas, contacts, damascene lines, etc.). Accurately stopping CMP processing at a desired endpoint is important for maintaining a high throughput because the substrate assembly may need to be re-polished if it is under-planarized, or components on the substrate may be destroyed if it is over-polished. Thus, it is highly desirable to stop CMP processing at the desired endpoint.

In one conventional method for determining the endpoint of CMP processing, the planarizing period of a particular substrate is estimated using an estimated polishing rate based upon the polishing rate of identical substrates that were planarized under the same conditions. The estimated planarizing period for a particular substrate, however, may not be accurate because the polishing rate and other variables may change from one substrate to another. Thus, this method may not produce accurate results.

Other methods for determining the endpoint of CMP processing include using an on-line Kalman filter have been demonstrated. For example, Vincent et al. in J. Electrochem. Soc. Vol. 144, No. 7, pp. 2467–2472 (July 1997), Vincent et al. in Mat. Res. Soc. Symp. Proc. Vol 406, pp. 87–93 1996, Vincent et al. in IEEE Transactions on Semiconductor Manufacturing, Vol. 10, No. 1, pp. 42–51 (February 1997), and Vincent et al. in ISSN1083-1312/971/1701-04274 (1997), herein incorporated by reference, teach on-line use of a Kalman filter to promote a preferred end-point during CMP on a wafer. However, they do not teach deconvolution of array and periphery data on a patterned wafer.

In another method for determining the endpoint of CMP processing, the substrate is removed from the pad and then a measuring device measures a change in thickness of the substrate. Removing the substrate from the pad, however, interrupts the planarizing process and may damage the substrate. Thus, this method generally reduces the throughput of CMP processing.

Other teachings of interest include Yueh (U.S. Pat. No. 5,865,665) and Hoffman (U.S. Pat. No. 6,290,572), and are also incorporated herein by reference. In one method, control of a process parameter of a planarizing cycle is done by predicting a thickness of an outer film over a first region on the substrate assembly and providing an estimate of an erosion rate relationship based on a first erosion rate over the first region and a second erosion rate over a second region. The erosion rate relationship can be the first and second erosion rates or an erosion rate ratio between the first and second erosion rates. The first region can be an array at a first elevation and the second region can be a periphery area at a second elevation.

The endpointing procedure continues by determining an estimated value of an output factor, such as a reflectance intensity from the substrate assembly. The output factor can be estimated by modeling the output factor based upon the thickness of the outer layer over the first region and the erosion rate ratio between the first region and the second region. The endpointing procedure continues by ascertaining an updated predicted thickness of the outer film over the first region by measuring an actual value of the output factor during the planarizing cycle without interrupting removal of material from the substrate, and then updating the predicted thickness of the outer film according to the variance between the actual value of the output factor and the estimated value of the output factor. The endpointing process also continues by repeating the determining procedure and the ascertaining procedure using the revised predicted thickness of the outer layer of an immediately previous iteration to bring the estimated value of the output factor to within a desired range of the actual value of the output factor. The planarizing process is terminated when the updated predicted thickness of the outer layer over the first region is within a desired range of an endpoint elevation in a substrate assembly.

What is needed in the art is a method of operating a physical process with results that overcome at least one of the challenges of the prior art.

SUMMARY

An embodiment includes an online control loop that is coupled with an offline metrology control loop. The offline metrology control loop is an algorithm that cycles through various information exchanges, and makes an information statement to the online control loop. The online control loop operates in real time and controls a physical process. The offline metrology control loop operates in asynchronous mode with respect to the online control loop. In one embodiment, the online control loop uses a first extended Kalman filter ("EKF") estimator.

One embodiment includes a chemical-mechanical polishing ("CMP") apparatus as part of the physical interface. Accordingly for a CMP process, one embodiment includes a CMP machine with an optical control system that uses the online control loop to set operating conditions.

One embodiment relates to a control system. The control system includes a physical interface such as a CMP apparatus. The control system includes an online first, EKF estimator that is used in the online inner control loop. The control system also includes an offline metrology data base that optionally uses a second EKF estimator that is used in an offline metrology control loop. Accordingly, the control system includes an information statement that obtains data from the offline metrology data base, and is conveyed to the first EKF estimator. The control system also includes a control statement from the online, first EKF estimator to the physical interface.

Another embodiment relates to a process of fabricating and assembling a microelectronic system. The two-loop control system includes an online inner control loop and an offline metrology control loop. After the substrate has been processed according to a method embodiment, the substrate is assembled into an integrated microelectronic device. The processes and structures that are achieved by the two-loop method in the various embodiments, are applicable to a variety of devices and apparatuses. For example, a substrate that has been polished by a two-loop embodiment set forth herein, can be assembled into a chip package according to an embodiment. In another example, the substrate that has been polished by the two-loop embodiment includes assembly with an electronic device such as a processor, a memory module, a memory system, and a digital computer.

BRIEF DESCRIPTION OF THE DRAWINGS

In order to illustrate the manner in which embodiments are obtained, a more particular description of the invention briefly described above will be rendered by reference to specific embodiments thereof which are illustrated in the appended drawings. Understanding that these drawings depict only typical embodiments that are not necessarily drawn to scale and are not therefore to be considered to be limiting of its scope, embodiments will be described and explained with additional specificity and detail through the use of the accompanying figures in which.

DETAILED DESCRIPTION

Figure 1:
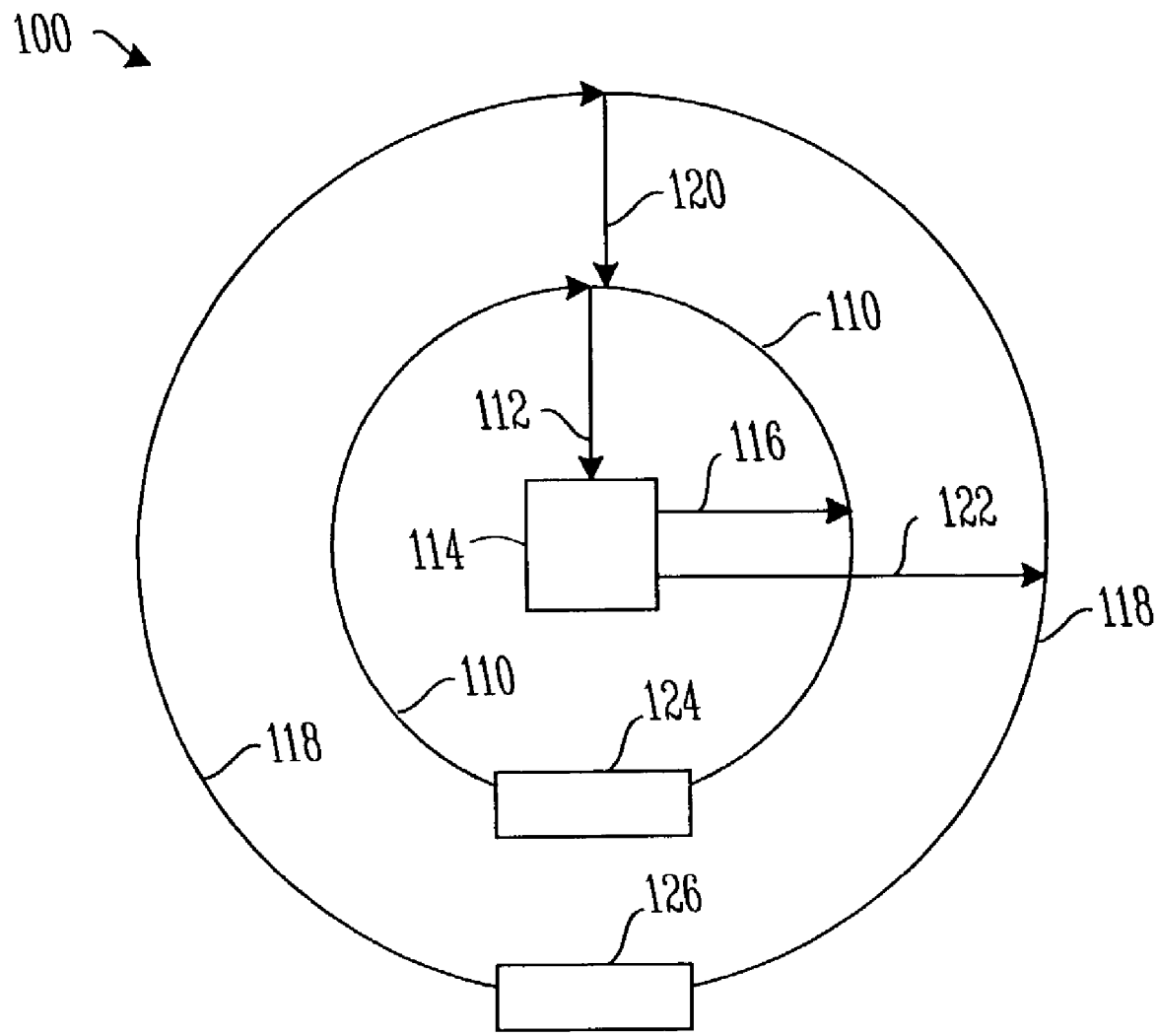
FIG. 1 is an overview schematic of a method according to an embodiment.

In the following detailed description, reference is made to the accompanying drawings which form a part hereof, and in which is shown, by way of illustration, specific ways which embodiments may be practiced. In the drawings, like numerals describe substantially similar components throughout the several views for general embodiments. These embodiments are described in sufficient detail to enable those skilled in the art to practice various embodiments. Other embodiments may be utilized and system and process changes may be made without departing from the scope of the various embodiments.

FIG. 1 is an overview schematic of a method 100 according to an embodiment. An online control loop 110 (twice referenced) is represented as an algorithm that cycles through various information exchanges, and makes a control statement 112 to a physical process 114 such as one involving a CMP process. Additionally, an online loop information out ("OLLIO") communication 116 feeds information from the physical process back to the online control loop 110.

An offline metrology control loop 118 (twice referenced) is represented as an algorithm that cycles through various information exchanges, and makes an information statement 120 to the online control loop 110. In one embodiment, "information statement" means that the information statement 120 is not a control statement to the online control loop 110, rather; it is a process-alteration statement, that is based upon offline metrology, and that has the force and effect of a "suggestion" to the online control loop 110. However, the online control loop 110 retains the ultimate control over the physical process 114.

Additionally, an offline loop information out ("OFLIO") communication 122 feeds information from the physical process to the offline metrology control loop 118. Accordingly, the offline data can be updated by the online data.

The online control loop 110 operates in real time. According to one embodiment, the online control loop 110 is active any time the physical process 114 is in operation. However, the offline metrology control loop 118 operates in asynchronous mode with respect to the online control loop 110. Therefore, the offline metrology control loop 118 may or may not issue an information statement 120 to the online control loop 110 after each cycle of the online control loop 110.

In one embodiment, the online control loop 110 uses a first extended Kalman filter ("EKF") engine 124 to set boundary conditions that are known for the given physical process 114. For example, an EKF algorithm can blunder into divergent operating conditions that are outside the bounds of reasonable operation. Accordingly, conventional boundary conditions can be programmed to the online first EKF engine 124, and if a divergent operating condition is developed by the EKF algorithm, it is countermanded by the boundary conditions within the first EKF engine 124.

The first EKF engine 124 is positioned in the online control loop 110. In one embodiment, the first EKF engine 124 is operated according to the algorithms set forth in Hofmann (U.S. Pat. No. 6,290,572), the disclosure of which is incorporated herein by specific reference. Accordingly for a CMP process, one embodiment includes a CMP apparatus with an optical control system. Further according to an embodiment, particular state variables are monitored for endpointing the CMP process. For example, one state variable for a CMP process includes the depth of thickness of a layer that is being planarized, such as an array layer or a periphery layer on a semiconductive substrate. As another example, one state variable is the erosion rate of a top layer over an array that is being fabricated on a semiconductive substrate. As another example, one state variable is the erosion rate of a top layer over the periphery. As another example, one state variable is the erosion rate ratio of periphery erosion rate over the periphery areas. As another example, one state variable is the erosion rate ratio of array erosion rate over the array areas. The periphery erosion rate over the periphery areas affects the array erosion rate over the array because the array erosion rate generally decreases as the planarizing cycle progresses.

A second engine 126 is positioned in the offline control loop 118. In one embodiment, the second engine 126 is a second EKF engine 126. In one embodiment, the second engine 126 is a general smoother engine 126 as is known in the art. In any event, the second engine 126 operates from offline data, and although it can operate as a general smoother engine or an EKF engine, the data it uses is previously obtained meterology from a previous run(s).

In one embodiment, an error analysis is carried out between the online control loop 110 as it estimates processing conditions, and the offline metrology control loop 118 as it can often provide absolute conditions such as endpoint thickness, endpoint reflectance, and others. The error analysis can operate on an error minimizing algorithm such as the concept in the conventional least squares method.

An error analysis is carried out where the difference between online data obtained, and offline metrology is determined, and a new information statement 120 and optionally a new control statement 112 are generated, until the processes converge to an acceptable difference.

Accordingly for a CMP process, one embodiment includes a CMP machine with an optical control system that uses the first EKF engine 124 and the second engine 126 as set forth herein. Some data that the control system uses as absolutes includes boundary conditions that are built into the first EKF engine 124. Further according to an embodiment, particular state variables are monitored for endpointing the CMP process. For example, one state variable for a CMP process includes the depth of thickness of a layer that is being planarized, such as an array layer or a periphery layer on a substrate. As another example, one state variable is the erosion rate of a top layer over an array on a substrate. As another example, one state variable is the erosion rate of a top layer over a periphery on a substrate. As another example, one state variable is the erosion rate ratio of periphery erosion rate over the periphery areas on a substrate. As another example, one state variable is the erosion rate ratio of array erosion rate over the array areas on a substrate. The periphery erosion rate over the periphery areas affects the array erosion rate over the array because the array erosion rate generally decreases as the planarizing cycle progresses.

In one embodiment, an inner estimator control loop (tracking clockwise, 110, 124, 110) is coupled with an offline metrology control loop (tracking clockwise, 118, 126, 118) to control wafer polishing. The inner control loop is an estimator loop with data that estimates an end point such as a final thickness of a wafer. The outer control loop is a knowledge data base that has "absolute" knowledge of various wafer properties at various wafer thicknesses, such as the endpoint thickness and endpoint reflectance.

The outer control loop re-runs all the data it receives from the inner control loop and it will calculate better estimates for the inner control loop data, such as polishing rate, real-time thickness, and end point. As far as ultimate control after start-up, the inner control loop always operates with a control priority. The outer control loop offers "suggestions" to the inner control loop, which can evaluate the suggestions, and then implement them if they are acceptable. The outer control loop operates in an asynchronous manner with respect to the inner control loop.

In one embodiment, startup is carried out by polishing the first three wafers of a batch. The inner control loop exerts imprecise control over the first three wafers by use of various conventional parameters of polishing that are known in the art, such as the EKF algorithms set forth in Hofmann (U.S. Pat. No. 6,290,572). Alternatively, the various conventional parameters of polishing can be unique to the type of wafer that is being polished, such that for a given startup for a wafer run, the first three wafers are polished with inner-loop control that is unique to the wafer type.

Each wafer to be polished can behave differently for various external reasons. One external reason is the friction heating of the polishing pad. As the pad heats during polishing, the pad hardness can change, the slurry temperature can change, which can affect the slurry chemistry, and other conditions can change that have been observed in the art.

Figure 2:
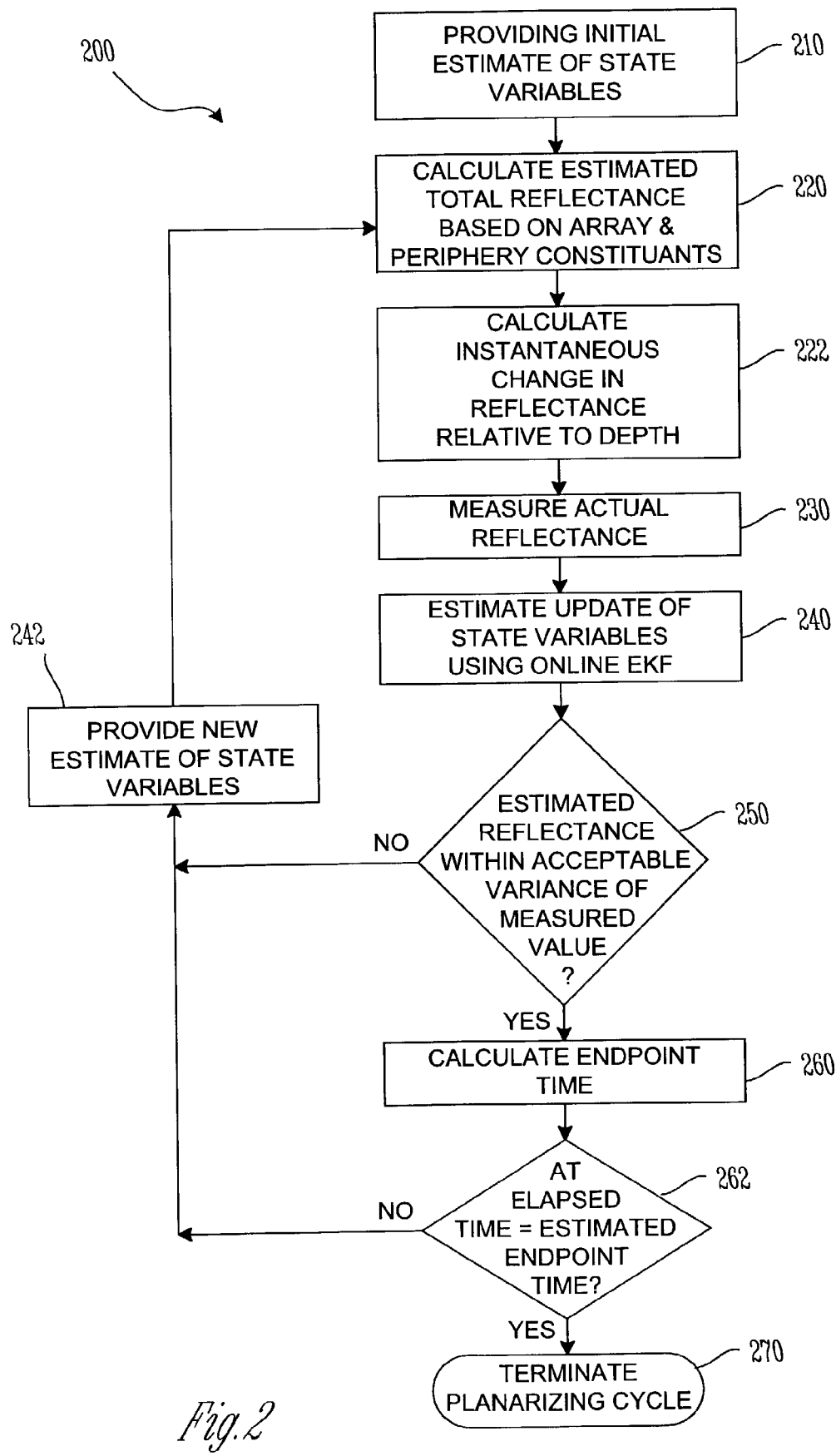
FIG. 2 is a flowchart of a method portion for estimating the endpoint of a CMP cycle using state variables and array/periphery optical algorithms according to an embodiment.

FIG. 2 is a flowchart of a method portion 200 for estimating the endpoint of a CMP cycle using the state variables and the array/periphery optical algorithms described in Hofmann (U.S. Pat. No. 6,290,572). The method portion 200 is used in connection with an offline metrology EKF (not pictured) or other offline smoother as set forth herein (see FIGS. 1 and 4). The first series of routines 210–240 estimates the state variables of the planarizing cycle, and the second series of the routines 250–270 estimates the endpoint of the planarizing cycle based upon the estimates of the state variables. The algorithm calculates the estimates of the state variables using the signals from optical sensor data along with algorithms and data files that are programmed in an optical module and an online EKF module.

At 210 an initial estimate of state variables is provided. At 220, an estimated total reflectance is calculated, based upon array and periphery constituents of a substrate as they are collectively detected. At 222 an instantaneous change in reflectance of the substrate is calculated, relative to the depth of the substrate layer that is being polished. At 230 a measurement of actual reflectance is taken. At 240 an update of the state variables is estimated by use of the online EKF 124 (FIG. 1). At 250, the reflectance is estimated within the acceptable variance of measured reflectance. If the estimated reflectance is not within the acceptable variance, the method branches to 242. At 242, a new estimate of state variables is provided, and the method sends these new estimates to 220.

If the estimated reflectance is within the acceptable variance, the method proceeds to 260 to begin endpoint evaluation. At 260, an endpoint time is calculated, when a given layer in a wafer substrate will have reached its preferred thickness.

At 262, a query determines whether the elapsed physical process time is equal to the most recently calculated endpoint time. If the query receives an affirmative, the CMP process is terminated at 270. If the query receives a negative, the method branches to 242, whereat a new estimate of state variables is provided, and the method is essentially repeated.

It should be clear to one of ordinary skill in the art that a set of instructions can be fixed in a computer readable medium to carry out an algorithm according to various embodiments.

In accordance with a method embodiment, the outer loop (FIGS. 1 and 4) can interrupt the method portion 200 that is the inner loop, and send an information statement to the method portion as set forth herein.

Figure 3:
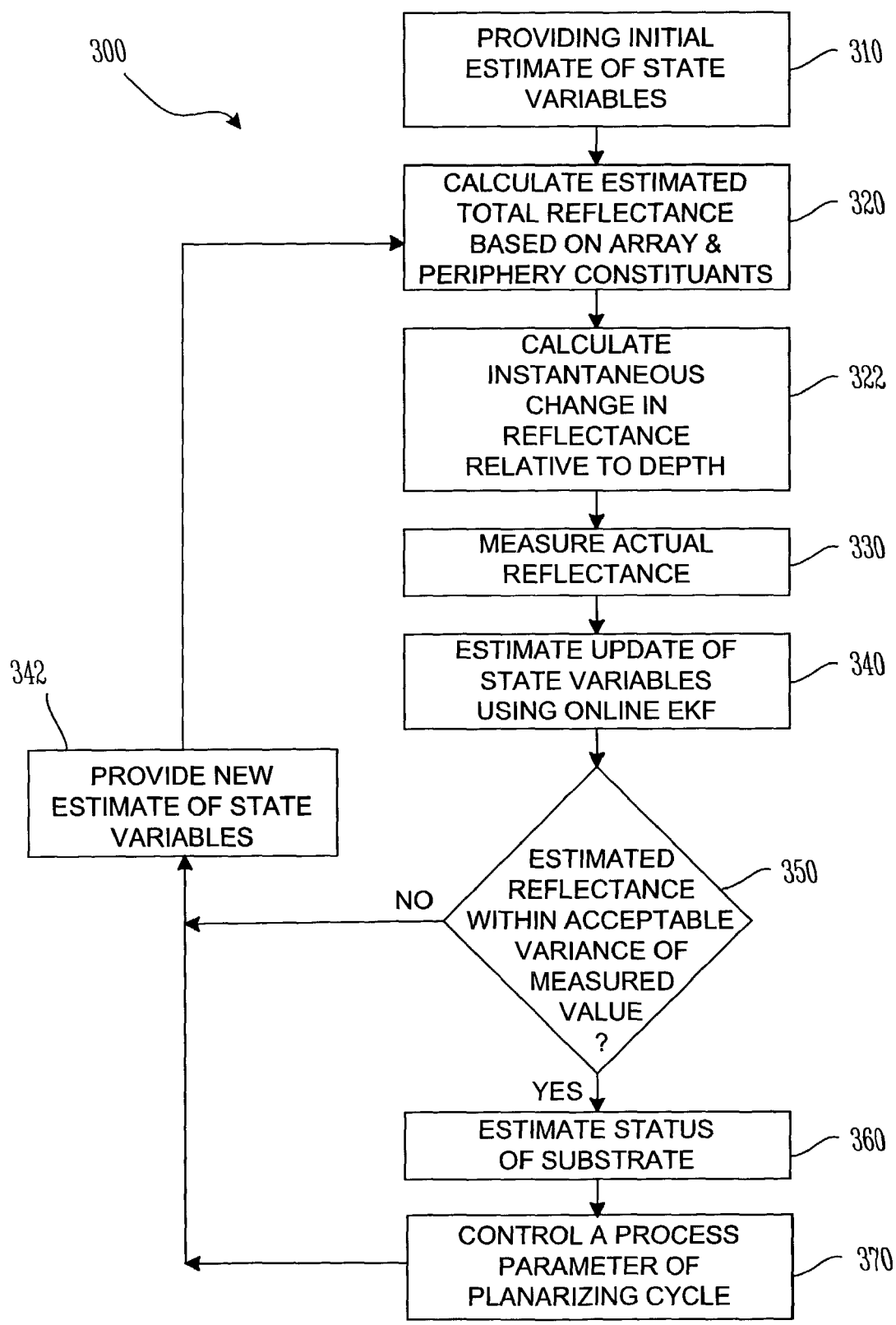
FIG. 3 is a flowchart of another method portion in accordance with another embodiment.

FIG. 3 is a flowchart of another method portion 300 in accordance with another embodiment. In one embodiment this method can be applied to polishing a substrate. The method portion 300 is used in connection with an offline metrology EKF (not pictured) or other offline smoother as set forth herein (see FIGS. 1 and 4). In this embodiment, the method includes the routines 310–350 described similarly in reference to the routines 210–250, respectively in FIG. 2. A difference is a substrate status routine 360, and a control routine 370. At 360, the substrate status routine estimates the status of the substrate surface according to the estimated values of the state variables. The substrate status, for example, can be the thickness of an outer film over either the array areas of the periphery areas, the array erosion rate, the periphery erosion rate, or several other of the state variables. The control routine 370 changes or maintains one or more parameters of the planarizing cycle according to the estimated status of the substrate surface.

In accordance with a method embodiment, the outer loop (FIGS. 1 and 4) can interrupt the method portion 300 that is the inner loop, and send an information statement to the method portion as set forth herein.

Figure 4:
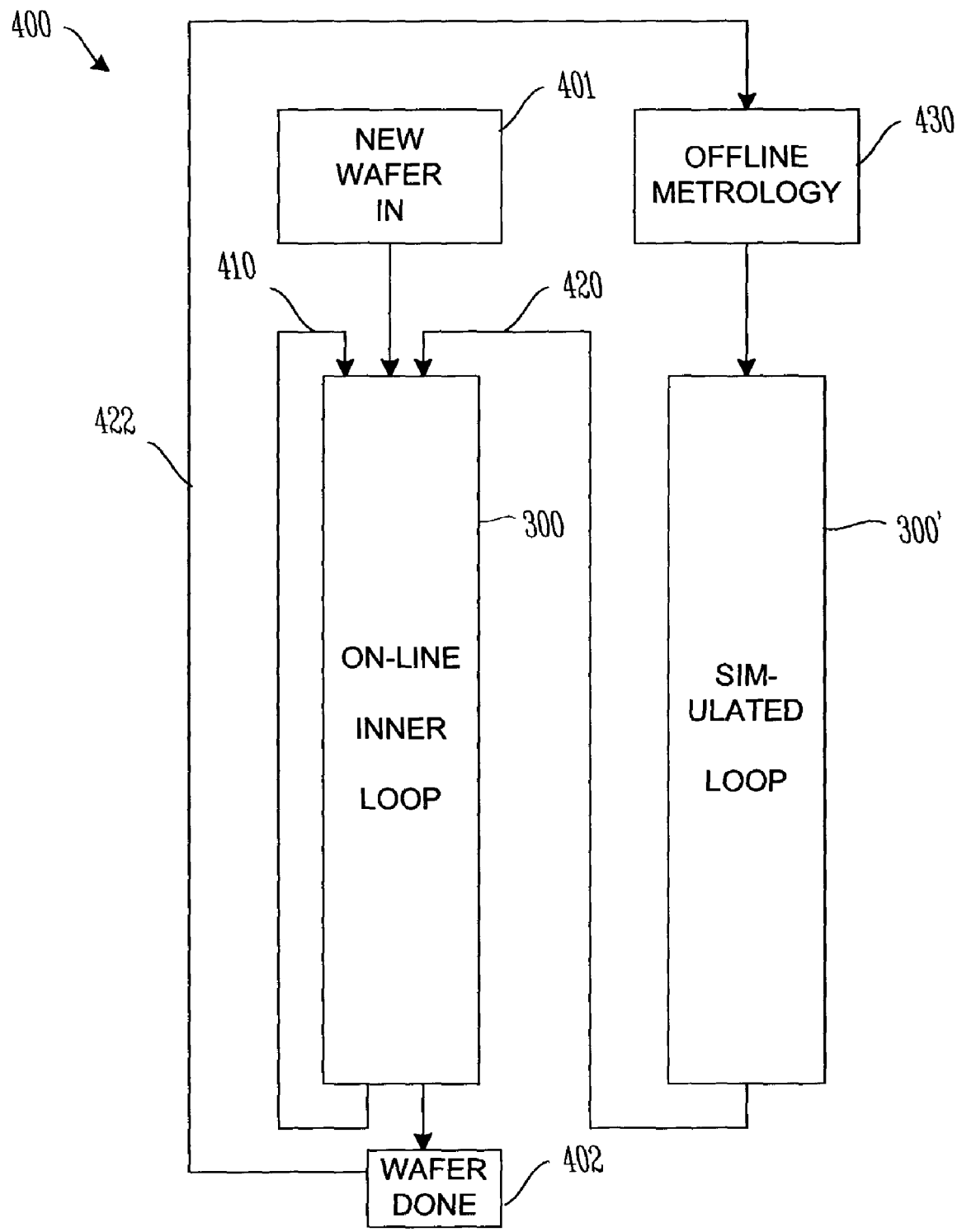
FIG. 4 is a flowchart of a combination of a method portion that is used in connection with a wafer-to-wafer update according to an embodiment.

FIG. 4 is a flowchart 400 of a combination of the method portion 300 that is used as set forth above, in connection with a wafer-to-wafer update 410 once the initial conditions are established for a batch of wafers. In the flowchart, a new wafer comes in 401 and is processed by use of the inner control loop and offline metrology outer control loop embodiment. When processing of the wafer is finished, the wafer is done 402.

The online inner control loop 300 and 410 represents use of the realtime EKF engine 124 (FIG. 1) and the algorithm as is described in FIG. 3.

In one embodiment, the method portion is the method portion 200 as set forth in FIG. 2. Accordingly, the method portion 200 replaces the method portion 300 in FIG. 3. According to this embodiment, the online inner control loop is method portion 200 from FIG. 2 and the wafer-to-wafer loop 410. This online inner control loop represents use of the real-time EKF engine 124 (FIG. 1) and algorithm as is described in FIG. 2.

The offline metrology control loop 430, 300', 420, 422 includes an EKF engine 430 or general smoother engine 430, that uses offline data to perturb the online inner control loop 300, 410 with an information statement 420. The information statement 420 is determined asynchronously with respect to the online inner control loop 300, 410 and is delivered from a simulated loop 300'. By "simulated loop" it is understood that an EKF or general smoother is put into service that takes data from the offline metrology 430 and generates information for the online inner control loop 300, 410 in a manner similar to the algorithm depicted in FIG. 3. Similarly, the simulated loop can be taken from the method portion 200 as set forth in FIG. 2.

One datum that can be sent as an information statement 420 to the online inner control loop 300, 410 is an end-point thickness that is known to an "absolute" degree within conventional detection limitations. Another datum that can be sent is an end-point reflectance that can likewise be conventional for the wafer type.

In one embodiment, the off-line metrology control loop 430, 300', 420, 422 uses an EKF estimator engine that affects the information statement 420 that is sent to the online control loop 300, 410. However, the online inner control loop 300, 410 exerts ultimate control over the system 400 such that all control statements to the physical system 114 (FIG. 1) issue exclusively from the online inner control loop 300, 410.

By operation of the system 400, there arises a time evolution of the system. The passage of time allows for an over-determined system such that a convergence occurs between the online control and the offline metrology control. Where the physical interface involves planarizing a substrate such as by CMP, the time evolution of the system allows for a deconvolution of the individual data of the time-affected changing reflectance between the array reflectance and the periphery reflectance. The complex evolution of the planarized substrate is discernable by evaluating reflectance data over a time interval by use of the inner loop-outer loop method embodiment.

In one embodiment, a method includes estimating a state variable for a physical process by use of an EKF that operates in the online control loop 300, 410. After the state variable is estimated, a control statement is applied to the physical process 114 (FIG. 1). Next, but asynchronously, an information statement 420 is sent by way of the offline metrology 430 and the simulated loop 300' to the online inner loop 300, 410. The information statement 420 optionally changes estimating the state variable that is done by the online inner loop 300, 410. In one embodiment, the offline metrology control loop 430, 300', 420, 422 includes an EKF engine 430. In one embodiment, the online control loop 300, 410 generates at least two control cycles before receipt of the information statement 420 from the offline metrology control loop.

In one embodiment, a batch of wafers is taken one-by-one and processed according to the two-loop method. After processing three wafers by use of the inner loop alone, the method invokes the offline metrology of the outer loop. Accordingly, the third wafer processed represents an $n^{th}$ process run. The outer loop sends an information statement in the form of process parameter data from the $n^{th}$ process run to achieve a process parameter first refinement. As set forth herein, the first process parameter refinement can be the information statement. Next, the inner loop optionally adopts the first refinement, and uses the inner loop EKF to achieve a process parameter subsequent refinement. This subsequent refinement can be a change in process parameters. Thereafter, a control statement in the form of the process parameter subsequent refinement is sent to the physical interface. Where the fourth wafer is being processed, it represents an $(n+m)^{th}$ process run, and m is equal to 1.

In one embodiment, at least two process refinement cycles are carried out by the online inner control loop before any information statement from the outer loop is communicated, let alone adopted. Accordingly, before the process parameter subsequent refinement is achieved by use of the outer loop information statement, a process parameter "zeroth" refinement is applied by the inner control loop to an $(n-1)^{st}$ process run.

As set forth above, processing can be carried out by generating offline metrology data from the first three wafers. Accordingly, three wafers should have been processed to build the offline metrology database. The offline metrology database is therefore assembled from a realtime wafer batch. Alternatively, processing can be carried out with a preexisting offline metrology database that had been assembled from previous knowledge, whether it is convention knowledge of processing or in-house processing that is unique to the type of wafer that is being planarized. Accordingly, the process runs are taken from a previous wafer batch or previous wafer batches, and there can be several process runs including more than three.

Another embodiment relates to a control system. The control system includes a physical interface. In one embodiment the physical interface includes a CMP apparatus. The CMP apparatus can include a conventional, commercially obtained CMP tool. The control system includes an online first, EKF estimator such as is described in FIGS. 1–4. The control system also includes an offline metrology data base that optionally uses a second EKF estimator such as is likewise described in FIGS. 1–4. Accordingly, the control system includes an information statement that obtains data from the offline metrology data base, and is conveyed to the first EKF estimator. The control system also includes a control statement from the online EKF estimator to the physical interface. As set forth herein, the online, first EKF estimator is part of an inner control loop, and the inner control loop operates in a cycle that is asynchronous from the second EKF that operates in the outer control loop with the offline metrology database.

In one embodiment, the offline metrology control loop can interrupt the online control loop at any stage of the online control loop cycle. By "interrupt", it is understood that the offline metrology control loop can issue an information statement 120 (FIG. 1), 420 (FIG. 4) that the online control loop can evaluate and elect to implement or reject. In this embodiment, the interrupt can be evaluated immediately, or it can be held in a buffer until the online control loop is at a decision node, or until the online control loop has finished a cycle, and is prepared to transmit wafer-to-wafer data for processing the subsequent wafer.

FIGS. 5 through 10 illustrate other embodiments. One embodiment relates to a process of fabricating and assembling a microelectronic system. The process includes processing a substrate with a two-control loop control system. According to various embodiments set forth herein, the two-control loop control system includes an online inner control loop and an offline metrology control loop. After the substrate has been processed according to a method embodiment, the substrate is assembled into an integrated microelectronic device.

The processes and structures that are achieved by the offline metrology method in the various embodiments, are applicable to a variety of devices and apparatuses. Specific systems can be made by process embodiments, or that include an embodiment or embodiments of the structure as disclosed herein. For example, a substrate that has been polished by an offline metrology embodiment set forth herein, can be assembled into a chip package according to an embodiment. In another example, the substrate that has been polished by the offline metrology embodiment includes polished structures that are used for electrical coupling for incidental, non-memory applications such as a line for a sense amplifier, or a trace between active devices on a substrate.

In one embodiment, a substrate includes an array of microelectronic structures such as a line of sense amplifiers that were polished by the two-loop method. In another embodiment, the substrate is part of a 2-dimensional array of storage devices such as a DRAM array. In another embodiment, the substrate is part of an electrical device that includes the semiconductor substrate in a chip package and the chip package is part of a memory module or part of a chipset. In another embodiment, the memory module is part of a DRAM module that is inserted into a host such as a motherboard or a digital computer. In another embodiment, specific systems can be made that include the substrate that has been polished by an offline metrology embodiment. For example, a chip package can contain a substrate such as one set forth in this disclosure. In another embodiment, a polished substrate is part of an electrical device that includes the semiconductor substrate in a chip package and the chip package is part of a memory module or part of a chipset. In another embodiment, the memory module is part of a dynamic random access memory module that is inserted into a host such as a motherboard or a digital computer. In another embodiment, the polished substrate is part of an electronic system. In another embodiment, the polished substrate is fabricated with a floating gate. In another embodiment, the polished substrate is fabricated with a floating gate that is part of a flash memory device that in turn is part of a chipset such as a basic input-output system (BIOS) for an electrical device.

Figure 5:
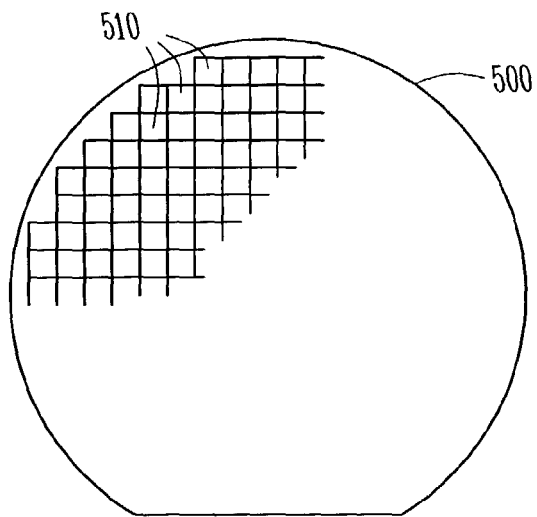
FIG. 5 is a top view of a wafer or substrate containing semiconductor dies in accordance with an embodiment.

FIG. 5 is a top view of a wafer 500 or substrate containing semiconductor dies in accordance with an embodiment. With reference to FIG. 5, a semiconductor die 510 can be produced from the silicon wafer 500 that has been polished according to an embodiment. A die 510 is an individual pattern, typically rectangular, on a substrate that contains circuitry to perform a specific function. A semiconductor wafer 500 will typically contain a repeated pattern of such dies 510 containing the same functionality. The die 510 can further contain additional circuitry to extend to such complex devices as a monolithic processor with multiple functionality. The die 510 is typically packaged in a protective casing (not shown) with leads extending therefrom (not shown) providing access to the circuitry of the die 510 for unilateral or bilateral communication and control. In one embodiment, the die 510 is incased in a host such as a chip package (not shown) such as a chip-scale package (CSP).

Figure 6:
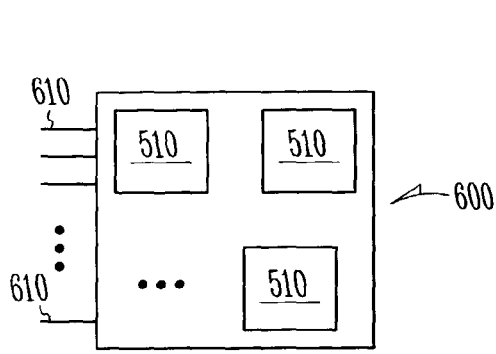
FIG. 6 is a block diagram of a circuit module in accordance with an embodiment.

FIG. 6 is a block diagram of a circuit module 600 in accordance with an embodiment. As shown in FIG. 6, two or more dies 510 at least one of which has been polished according to an embodiment, can be combined, with or without protective casing, into a host such as a circuit module 600 to enhance or extend the functionality of an individual die 510. Circuit module 600 can be a combination of dies 510 representing a variety of functions, or a combination of dies 510 containing the same functionality. Some examples of a circuit module 600 include memory modules, device drivers, power modules, communication modems, processor modules and application-specific modules and can include multi-layer, multi-chip modules. Circuit module 600 can be a sub-component of a variety of electronic systems, such as a clock, a television, a cell phone, a personal computer, an automobile, an industrial control system, an aircraft, a hand-held, and others. Circuit module 600 will have a variety of leads 610 extending therefrom providing unilateral or bilateral communication and control. In another embodiment, circuit module 600 includes at least one substrate that has been polished according to an embodiment, and the substrate will be fabricated into a storage device.

Figure 7:
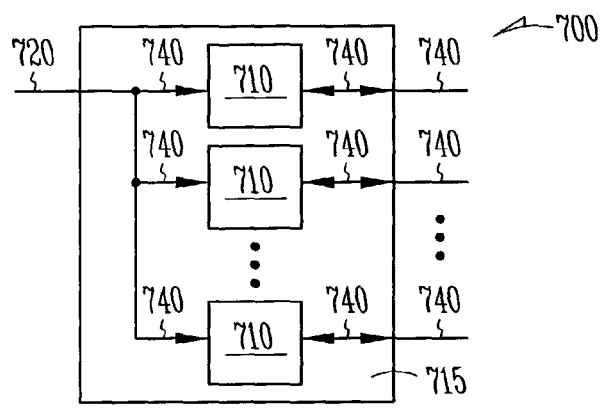
FIG. 7 is a block diagram of a memory module in accordance with an embodiment.

FIG. 7 is a block diagram of a memory module 700 in accordance with an embodiment. FIG. 7 shows one embodiment of a circuit module as a memory module 700 containing at least one substrate that has been polished according to an embodiment. Memory module 700 is a host that generally depicts a Single In-line Memory Module (SIMM) or Dual In-line Memory Module (DIMM). A SIMM or DIMM can generally be a printed circuit board ("PCB") or other support containing a series of memory devices. While a SIMM will have a single in-line set of contacts or leads, a DIMM will have a set of leads on each side of the support with each set representing separate I/O signals. Memory module 700 contains multiple memory devices 710 contained on a support 715, the number depending upon the desired bus width and the desire for parity. Memory module 700 can contain memory devices 710 on both sides of support 715. Memory module 700 accepts a command signal from an external controller (not shown) on a command link 720 and provides for data input and data output on data links 730. The command link 720 and data links 730 are connected to leads 740 extending from the support 715. Leads 740 are shown for conceptual purposes and are not limited to the positions shown in FIG. 7.

Figure 8:
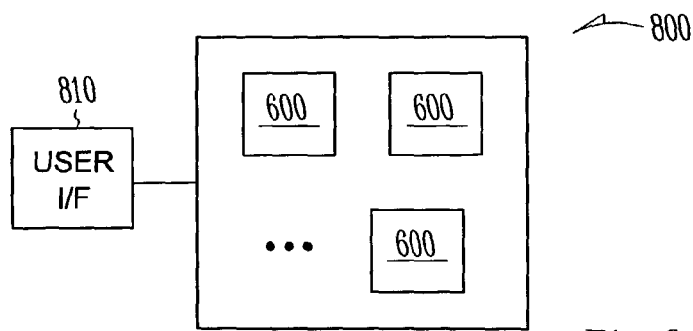
FIG. 8 is a block diagram of an electronic system in accordance with another embodiment the present invention.

FIG. 8 is a block diagram of an electronic system 800 in accordance with another embodiment. FIG. 8 shows another host type such as an electronic system 800 containing one or more circuit modules 600 as described above containing at least one of the substrates that have been polished according to an embodiment. Electronic system 800 generally contains a user interface 810. User interface 810 provides a user of the electronic system 800 with some form of control or observation of the results of the electronic system 800. Some examples of user interface 810 include the keyboard, pointing device, monitor and printer of a personal computer; the tuning dial, display and speakers of a radio; the ignition switch of the gas pedal of an automobile; and the card reader, keypad, display and currency dispenser of an automated teller machine. User interface 810 can further describe access ports provided to electronic system 800. Access ports are used to connect an electronic system to the more tangible user interface components previously exemplified. One or more of the circuit modules 600 can be a processor providing some form of manipulation, control or direction of inputs from or outputs to user interface 810, or of other information either preprogrammed into, or otherwise provided to, electronic system 800. As will be apparent from the lists of examples previously given, electronic system 800 will often contain certain mechanical components (not shown) in addition to the circuit modules 600 and user interface 810. It will be appreciated that the one or more circuit modules 600 in electronic system 800 can be replaced by a single integrated circuit. Furthermore, electronic system 800 can be a sub-component of a larger electronic system.

Figure 9:
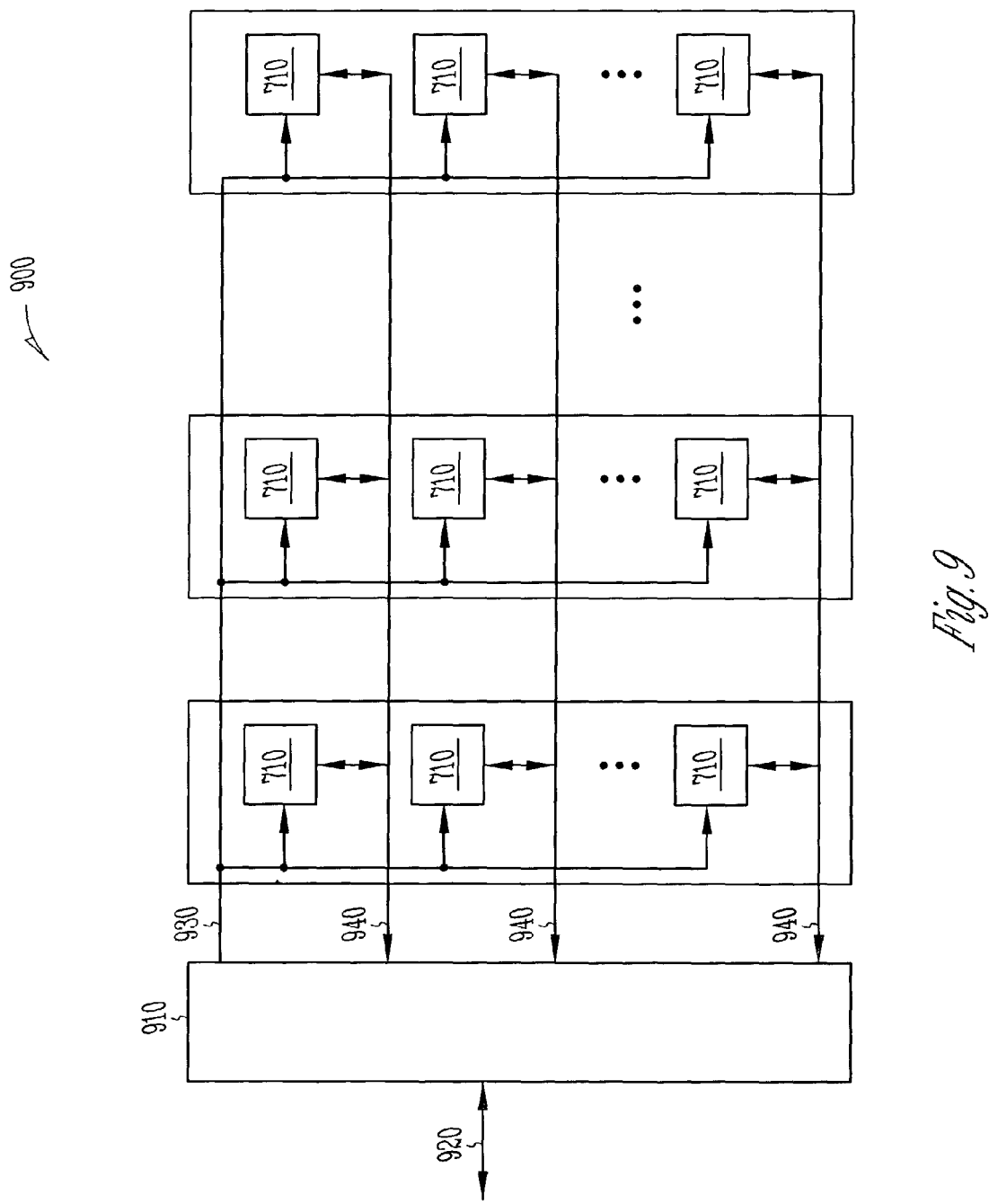
FIG. 9 is a block diagram of a memory system in accordance with an embodiment.

FIG. 9 is a block diagram of a memory system 900 in accordance with an embodiment. FIG. 9 shows one embodiment of an electrical device at a system level. Memory system 900 acts as a higher-level host that contains one or more memory devices 710 as described above including at least one substrate that has been polished according to an embodiment as set forth herein, and a memory controller 910 that can also include circuitry that is connected with a substrate that has been polished according to an embodiment as set forth herein. Memory controller 910 provides and controls a bidirectional interface between memory system 900 and an external system bus 920. Memory system 900 accepts a command signal from the external system bus 920 and relays it to the one or more memory devices 710 on a command link 930. Memory system 900 provides for data input and data output between the one or more memory devices 710 and external system bus 920 on data links 940.

Figure 10:
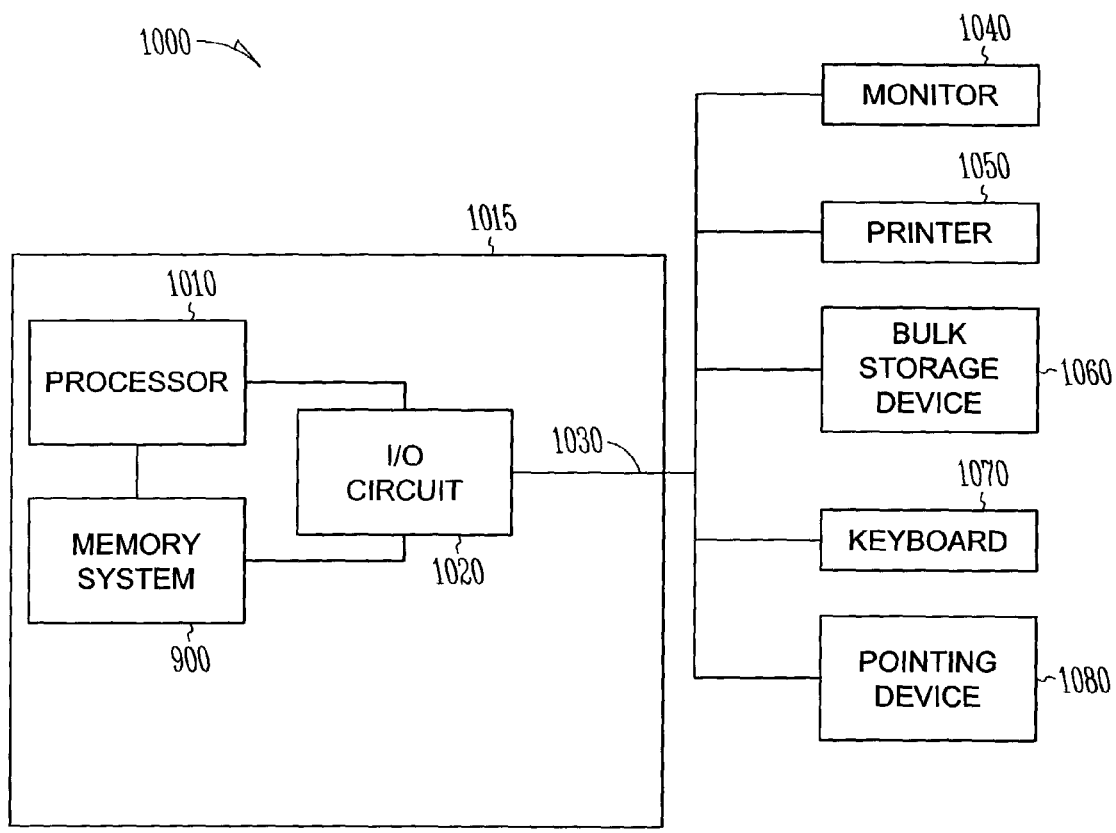
FIG. 10 is a block diagram of a computer system in accordance with an embodiment.

FIG. 10 is a block diagram of a computer system 1000 in accordance with an embodiment. FIG. 10 shows a further embodiment of an electronic system as a computer system 1000. Computer system 1000 contains a processor 1010 and a memory system 900 housed in a computer unit 1015. Computer system 1000 is but one example of an electronic system containing another electronic system, i.e. memory system 900, as a sub-component. The computer system 1000 can contain an input/output (I/O) circuit 1020 that is coupled to the processor 1010 and the memory system 900. Computer system 1000 optionally contains user interface components that are coupled to the I/O circuit 1020. In accordance with an embodiment, at least one of the processor 1010, the I/O circuit 1020, and the memory system 900 contain a substrate that has been polished according to an embodiment. The at least one substrate is an integrated circuit device that can be coupled to one of a plurality of I/O pads or pins 1030 of the I/O circuit 1020. The I/O circuit 1020 can then be coupled to a monitor 1040, a printer 1050, a bulk storage device 1060, a keyboard 1070 and a pointing device 1080. It will be appreciated that other components are often associated with computer system 1000 such as modems, device driver cards, additional storage devices, etc. It will further be appreciated that the processor 1010, memory system 900, I/O circuit 1020 and partially isolated structures or data storage devices of computer system 1000 can be incorporated on a single integrated circuit. Such single package processing units reduce the communication time between the processor 1010 and the memory system 1000.

CONCLUSION

Thus has been shown a substrate that has been polished according to a double-control loop EKF algorithm. The double control loop EKF algorithm includes offline metrology that can issue an information statement to an online inner control loop. The substrate can be assembled as part of an electronic system. The electronic system can include a memory system.

It is emphasized that the Abstract is provided to comply with 37 C.F.R. § 1.72(b) requiring an Abstract that will allow the reader to quickly ascertain the nature and gist of the technical disclosure. It is submitted with the understanding that it will not be used to interpret or limit the scope or meaning of the claims.

In the foregoing Detailed Description, various features are grouped together in a single embodiment for the purpose of streamlining the disclosure. This method of disclosure is not to be interpreted as reflecting an intention that the claimed embodiments of the invention require more features than are expressly recited in each claim. Rather, as the following claims reflect, inventive subject matter lies in less than all features of a single disclosed embodiment. Thus the following claims are hereby incorporated into the Detailed Description of Embodiments of the Invention, with each claim standing on its own as a separate preferred embodiment.

It will be readily understood to those skilled in the art that various other changes in the details, material, and arrangements of the parts and method stages which have been described and illustrated in order to explain the nature of this invention may be made without departing from the principles and scope of the invention as expressed in the subjoined claims.

What is claimed is:

1. A method comprising:
in an outer control loop, sending an information statement in the form of process parameter data from an $n^{th}$ process run, where n is an integer greater than zero, to achieve a process parameter first refinement;
in an inner control loop that uses an extended Kalman filter (EKF), applying the process parameter first refinement to the EKF to achieve a process parameter subsequent refinement;
sending a control statement in the form of the process parameter subsequent refinement to an $(n+m)^{th}$ process run, Wherein m is greater than or equal to 1; and
applying the refined process parameter to control a physical process.

2. The method according to claim 1, wherein the physical process includes an integrated microelectronic device polishing process.

3. The method according to claim 1, wherein the physical process includes a chemical-mechanical polishing process.

4. The method according to claim 1, before achieving the process parameter subsequent refinement, the method further including:
in the inner loop, sending a control statement in the form of process parameter zeroth refinement to achieve a process parameter zeroth refinement to an $(n-1)^{st}$ process run.

5. The method according to claim 1, wherein the outer loop includes an EKF estimator.

6. The method according to claim 1, wherein n=3 and wherein the first-through-third process runs are taken from a real-time wafer batch.

7. The method according to claim 1, wherein n=3 and wherein the first-through-third process runs are taken from a previous wafer batch.

8. A method of polishing a substrate comprising:
in an outer control loop, applying process parameter data from a process model from at least an $n^{th}$ process run, where n is an integer greater than zero, to achieve a process parameter first refinement;
in an inner control loop that uses an extended Kalman filter (EKF), applying the process parameter first refinement to achieve a process parameter subsequent refinement;
applying the process parameter subsequent refinement to an $(n+m)^{th}$ process run, wherein m is greater than or equal to 1; and
applying the refined process parameter to control a physical process of polishing the substrate.

9. The method of polishing a substrate according to claim 8, before achieving the process parameter subsequent refinement, the method further including:
in the inner loop, applying the process parameter zeroth refinement to the extended Kalman filter to achieve a process parameter zeroth refinement to an $(n-1)^{st}$ process run.

10. The method according to claim 8, wherein the method includes assembling a polished substrate into an integrated microelectronic device.

11. A method of planarizing a substrate comprising:
in an inner loop:
estimating state variables of a substrate planarizing cycle, wherein estimating includes the use of an extended Kalman filter (EKF) engine;
estimating the endpoint of the substrate planarizing cycle based upon the estimates of the state variables; and
applying a control statement to a physical process of planarizing the substrate; in an outer loop:
asynchronously comparing at least one of a state variable and an endpoint to an offline metrology database; and
sending an information statement from the outer loop to the inner loop,
wherein estimating state variables includes:
calculating total reflectance of a substrate that includes an array region and a periphery region;
calculating an instantaneous change in reflectance of the substrate relative to the depth being planarized;
measuring actual reflectance;
updating the state variables by an EKF estimate; and
estimating whether the reflectance is within a given variance of measured reflectance.

12. The method according to claim 11, wherein after estimating whether the reflectance is within a given variance the method includes:
if the estimated reflectance is not within the given variance:
providing a new estimate of state variables; and
recalculating total reflectance of the substrate;
and if the estimated reflectance is within the acceptable variance:
calculating an endpoint time;
determining whether the elapsed physical process time is equal to the most recently calculated endpoint time;
and if a query to a timer whether the calculated endpoint time has elapsed receives an affirmative:
terminating the process of planarizing the substrate;
and if the query to the timer receives a negative:
providing a new estimate of state variables; and
recalculating total reflectance of the substrate.

13. The method according to claim 11, wherein after estimating whether the reflectance is within a given variance the method includes:
if the estimated reflectance is not within the given variance:
providing a new estimate of state variables; and
recalculating total reflectance of the substrate;
and if the estimated reflectance is within the acceptable variance:
estimating the planarizing status of the substrate; and
altering at least one process parameter of the planarizing cycle.

* * * * *

UNITED STATES PATENT AND TRADEMARK OFFICE
CERTIFICATE OF CORRECTION

PATENT NO. : 7,087,527 B2
APPLICATION NO. : 10/232854
DATED : August 8, 2006
INVENTOR(S) : Hofmann It is certified that error appears in the above-identified patent and that said Letters Patent is hereby corrected as shown below:

In column 2, line 14, delete "Vol" and insert -- Vol. --, therefor.

In column 2, line 32, delete "method ," and insert -- method, --, therefor.

In column 4, line 11, after "embodiment" insert -- of --.

In column 5, line 36, delete "meterology" and insert -- metrology --, therefor.

In column 7, line 26, delete "2 10–250," and insert -- 210–250, --, therefor.

In column 12, line 14, delete "i.e." and insert -- i.e., --, therefor.

In column 13, line 18, in Claim 1, delete "Wherein" and insert -- wherein --, therefor.

Signed and Sealed this

Twenty-ninth Day of May, 2007

JON W. DUDAS
*Director of the United States Patent and Trademark Office*